(12) United States Patent
Yoshizawa

(10) Patent No.: US 8,221,211 B2
(45) Date of Patent: Jul. 17, 2012

(54) GAMING MACHINE AND METHOD

(75) Inventor: Kazumasa Yoshizawa, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 1190 days.

(21) Appl. No.: 12/031,163

(22) Filed: Feb. 14, 2008

(65) Prior Publication Data
US 2008/0227535 A1 Sep. 18, 2008

(30) Foreign Application Priority Data
Mar. 15, 2007 (JP) ................ 2007-066559

(51) Int. Cl.
*A63F 9/24* (2006.01)
(52) U.S. Cl. ............... 463/17; 463/16; 463/20; 463/25; 463/29
(58) Field of Classification Search ............ 463/16, 463/17, 20, 29, 25
See application file for complete search history.

(56) References Cited

U.S. PATENT DOCUMENTS

| 5,848,932 A | 12/1998 | Adams | |
|---|---|---|---|
| 6,446,965 B1 * | 9/2002 | Boulton | 273/142 R |
| 2002/0183105 A1 * | 12/2002 | Cannon et al. | 463/16 |

OTHER PUBLICATIONS

U.S. Appl. No. 12/031,186, filed Feb. 14, 2008, Yoshizawa.

* cited by examiner

*Primary Examiner* — Omkar Deodhar
(74) *Attorney, Agent, or Firm* — Edwards Wildman Palmer LLP

(57) ABSTRACT

A gaming machine of the present invention has: a roulette unit 3 for executing a roulette game; an image display device 10 for executing a slot game in parallel with the roulette game; an operating section displayed on the image display device 10, the operating section being capable of making BET operation while predicting a result of a game executed at least one of the roulette unit and the image display device; and a controller for controlling gaming operations in the roulette game and the slot game and controlling payout processing of a gaming value responsive to a payment. This controller performs control so that a result of the slot game is established by applying the result of the roulette game to the slot game.

5 Claims, 6 Drawing Sheets

GAMING MACHINE AND METHOD

BACKGROUND OF THE INVENTION

1. Field of the Invention

The present invention relates to a gaming machine and method, which is capable of executing a plurality of games according to the preference of a player.

2. Description of the Related Art

In general, a variety of gaming machines are installed in a gaming facility or a casino. Some of them are known as being constituted so that a plurality of games can be implemented by one game machine. For example, U.S. Pat. No. 5,848,932 discloses a gaming machine provided with: a first game of obtaining a payment according to a combination of symbols when three rotational reels are stopped; and a second game of obtaining a payment of a stopped position according to a stopped position of a bonus wheel to which a payment amount was given in advance. That is, this gaming machine is constituted such that, if winning is established according to a combination of three rotational reels by the first game, a payment amount according to the combination can be obtained, and further, a payment amount given to a portion at which a bonus wheel was stopped by the second game can be obtained.

However, the gaming machine proposed in the above-mentioned U.S. Pat. No. 5,848,932 includes a mere combination of two games, and game variations (such as the contents of games and a combination of payment patterns) are limited. In addition, a player is caused to have an interest in only results of the first and second games, thus making it impossible to sufficiently enhance the player's excitement of the gaming machine in spite of the fact that a plurality of games can be executed.

The present invention has been made in view of the above-described problem. It is an object of the present invention to provide a gaming machine and method, which is capable of increasing game variations and enhancing enjoyment more.

SUMMARY OF THE INVENTION

According to a first aspect of the present invention, there is provided a gaming machine, comprising: (a) a first gaming section for executing a first game; (b) a second gaming section for executing a second game in parallel with the first game; (c) an operating section, which is capable of making BET operation while predicting a result of a game to be executed at least at one of the first and second gaming sections; and (d) a controller configured to: (i) control gaming operations at the first and second gaming sections; (ii) control payout processing of a gaming value corresponding to BET operation from the operating section and payment; and (iii) apply a result of the first game in the first gaming section to the second game to be executed in the second gaming section, and then, perform control so that the result of the second game executed in the second gaming section is established.

According to the first aspect of the present invention, a second game is executed together with a first game, making it possible for a player to perform BET operation for either or both of the first and second games according to the player's own preference. In addition, a result of the second game is established depending upon that of the first game. Thus, there is an interrelationship between the first and second games executed in parallel with each other, and a player is caused to have an interest in the results of both of the games, making it possible to enhance enjoyment. Further, the result of the second game is dependent upon that of the first game, thus making it possible to increase game variations.

According to a second aspect of the present invention, there is provided a gaming machine, comprising a controller in the gaming machine of the first aspect, wherein the controller is configured to award a prize to a player on condition that the result of the second game is established in a predetermined special state when the result of the first game in the first gaming section is applied to the second game executed in the second gaming section.

According to the second aspect of the present invention, a possibility arises where, even if a player does not make BET operation for both of the first and second games, a special state is established every time a game is started, thus making it possible for a player participating in a game executed in a game machine to always have an interest in the game.

According to a third aspect of the present invention, there is provided a gaming machine, comprising a common station and a player terminal in the gaming machine of the second aspect, wherein the common station constitutes the first gaming section, in which the first game is executed, and the player terminal enables a plurality of players to execute a game and is provided with the operating section.

According to the third aspect of the present invention, a first game (such as a roulette game, a card game, a horserace game, or a dice game, for example) in which a large number of players can participate at the same time can be executed at the common station, for example, in the game machine. A second game (such as a slot game, a card game, or a bingo game, for example) can be executed at a player terminal such that a result thereof is established depending upon that of the first game by player terminal. According to such aspect, at each player terminal, a player can enjoy either or both of the first game executed in the common station and the second game executed at the player terminal.

According to a fourth aspect of the present invention, there is provided a game machine, comprising a player terminal in the game machine of the third aspect, wherein the player terminal has an image display section for displaying the second game as an image and displaying a BET table image for accepting the BET operation.

According to the fourth aspect of the present invention, in the gaming machine, at a player terminal, a player executes a second game at the image display section and enables BET operation of the first and second games. Therefore, the player at the player terminal can participate in the first game to be executed at the common station by making BET operation at the image display section and can participate in the second game to be executed at the image display section by making BET operation at the image display section, thus making it possible to easily execute both of these games.

According to a fifth aspect of the present invention, there is provided a gaming machine constituted as set forth below. In the gaming machine of the fourth aspect, the prize to be awarded to the player is a bonus game to be executed at a player terminal at which the prize is to be awarded.

According to the fifth aspect of the present invention, in the gaming machine, when a result of the first game is applied to the second game, if a special condition is established in the second game, a player can execute a bonus game and acquire more gaming values. Therefore, the player is caused to have more interest in the result of the first game, making it possible to enhance enjoyment.

According to a sixth aspect of the present invention, there is a gaming machine, comprising, in the gaming machine of the first aspect, a memory for storing procedures for executing the first game and procedures for executing the second game; and an image display section for displaying game contents of the first and second games, wherein the controller is configured to control image display of the first and second games at the image display section.

According to the sixth aspect of the present invention, in the gaming machine, when the result of the first game is applied to the second game, the image display section is installed at a single cabinet, and the image display section executes the first and second games. Therefore, it becomes possible to construct a gaming machine in which various types of games are combined with each other without enlarging the gaming machine in size.

According to a seventh aspect of the present invention, there is provided a gaming machine, comprising: (a) a common station for executing a roulette game; (b) a player terminal for executing a slot game of rotationally displaying a plurality of reels in parallel with the roulette game; (c) an operating section, which is capable of making BET operation while predicting a result of a game to be executed at least at the common station and player terminal; and (d) a controller, the controller being configured to: (i) control a gaming operation between the roulette game of the common station and a slot game of the player terminal; (ii) control payout processing of a gaming value corresponding to BET operation from the operating section and payment; (iii) stop and control rotation of at least one of a plurality of reels of the slot game, based upon random number generation; and (iv) detect a result of a roulette game executed in the common station, and stop and control rotation of at least one of a plurality of reels of a slot game executed at the player terminal, based upon the detected result of the roulette game.

According to the seventh aspect of the present invention, at least one of a plurality of reels in the slot game is displayed and controlled so as to rotate and stop, based upon a result of the roulette game, thus making it possible to increase game variations (such as game contents or a combination of payment patterns) and to enhance enjoyment relative to the player more.

According to an eighth aspect of the present invention, there is provided a gaming machine constituted as set forth below. In the gaming machine of the seventh aspect, the controller performs control so as to display rotation of at least one of a plurality of reels of the slot game in a stopped state, based upon the random number generation until a result of the roulette game is detected, and performs control so as to display, in a stopped state, rotation of a remaining reel that is displayed in a rotating state from among a plurality of reels of the slot game, based upon a result of the roulette game, when a result of the roulette game is detected.

According to the eighth aspect of the present invention, the roulette game and the slot game are executed in parallel with each other, and a result of the slot game is determined based upon a result of the roulette game, so that game variations can be increased.

According to a ninth aspect of the present invention, there is provided a gaming machine constituted as set forth below. In the gaming machine of the seventh aspect, the roulette game has a plurality of winning values; the plurality of reels has a plurality of symbols corresponding to the plurality of winning values of the roulette game; and the controller stops and controls rotation of the reel so that, when a result of the roulette game is detected, a symbol value corresponding to the winning value of the roulette game result is displayed.

According to the ninth aspect of the present invention, a plurality of reels in a slot game has a plurality of symbol values corresponding to a plurality of winning values in the roulette game, thus making it possible to offer an interrelationship between the two games.

According to a tenth aspect of the present invention, there is provided a gaming machine constituted as set forth below. In the gaming machine of the seventh aspect, the controller is configured to award a special prize to a player in a case where a combination of symbols displayed in a stopped manner on all reels of the slot game configures a predetermined winning combination.

According to the tenth aspect, it becomes possible for a player participating in a game executed by the gaming machine to always have an interest in the game.

According to an eleventh aspect, there is provided a gaming machine constituted as set forth below. In the gaming machine of the seventh aspect, the player terminal is provided in plurality.

According to the eleventh aspect of the present invention, a plurality of players can participate in a game at the same time.

According to a twelfth aspect of the present invention, there is provided a gaming method, comprising: (a) a BET acceptance step of accepting BET operation while predicting a result of a game to be executed at least at one of a first gaming section for executing a first game and a second gaming section for executing a second game; (b) a first game execution step of executing the first game; (c) a second game execution step of executing the second game in parallel with the first game; and (d) a payment payout step of performing payout processing of a payment responsive to BET accepted in the BET acceptance step after a result of a second game executed at the second gaming section is established by applying a result of the first game at the first gaming section to the second game executed at the second gaming section.

According to the twelfth aspect of the present invention, in the gaming method, the second game is executed together with the first game, enabling the player to make BET operation for either or both of the first and second games according to the player's preference. In addition, a result of the second game is established according to that of the first game. Thus, there is an interrelationship between the first and second games to be executed in parallel with each other. The player is caused to have an interest in the results of both of the games, making it possible to enhance enjoyment. In addition, the result of the second game is dependent upon that of the first game, thus making it possible to increase game variations.

According to a thirteenth aspect of the present invention, there is provided a gaming method, further comprising, in the gaming method of the twelfth aspect, a third game execution step of executing a third game when the result of the second game is established in a predetermined special state by applying the result of the first game executed at the first gaming section to the second game executed at the second gaming section.

According to the thirteenth aspect, in the gaming method, when the result of the first game is applied to the second game, if a special condition is established in the second game, the player further has a right to execute a third game, thus making it possible to acquire more gaming values. Therefore, the player is caused to have more interest in the result of the first game, making it possible to enhance enjoyment more.

According to the present invention, there can be provided a gaming machine and method, which is capable of increasing game variations (such as contents of a game or a combination of payment patterns) and enhancing enjoyment more.

DESCRIPTION OF THE PREFERRED EMBODIMENTS

Hereinafter, best mode for carrying out a gaming machine of the present invention will be described in detail.

The gaming machine of the present invention is characterized by comprising: a first gaming section for executing a first game; a second gaming section for executing a second game in parallel with the first game; and an operation section, which is capable of making BET operation while predicting a result of a game executed at least one of the first and second gaming sections. In this case, the result of the first game executed at the first gaming section influences that of the second game executed at the second gaming section, and the result of the second game is determined depending upon that of the first game.

As to the game contents of the first and second games, in the present embodiment, the first game is made up of a roulette game and the second game is made up of a slot machine type game (slot game) in which a plurality of reels (reels to be displayed as images) rotates. Therefore, the gaming machine of the present embodiment is constituted so that a first gaming section for executing a roulette game is installed at the center thereof, and a plurality of player terminals at which players can make BET operation is provided around the first gaming section. Further, an image display device constituting a second gaming section that is capable of executing the second game mentioned above is installed at each of the player terminals.

The player can make BET operation relative to the first game by using the image display device installed at the player terminal, and can also make BET operation relative to the second game executed at the image display device.

Hereinafter, the gaming machine and method according to the present invention will be specifically described with referring to the accompanying drawings.

Figure 1:
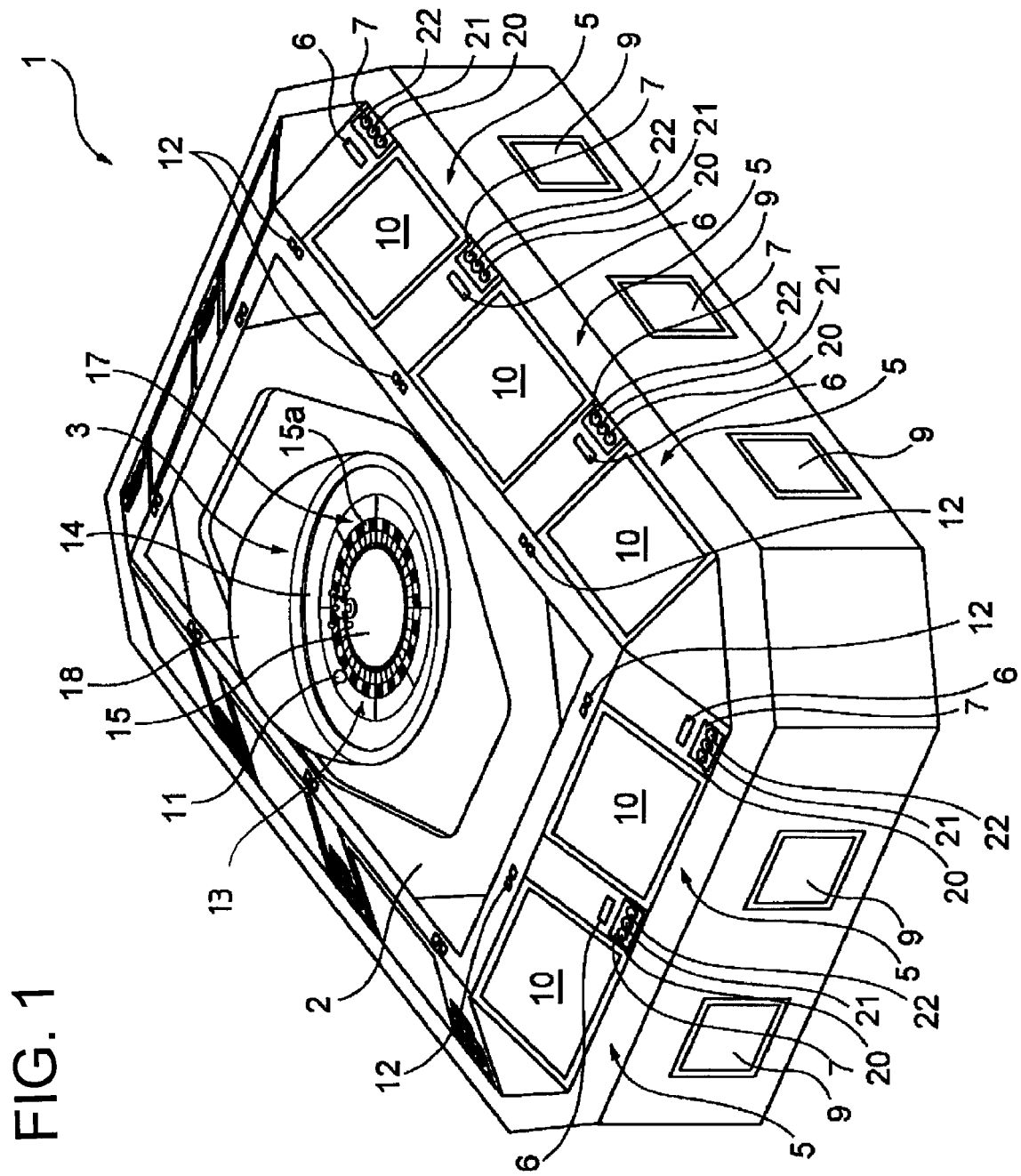
FIG. 1 is a perspective view showing an entire configuration showing one example of a gaming machine according to the present invention.

FIG. 1 is a perspective view showing one embodiment of the gaming machine according to the present embodiment.

As shown in FIG. 1, a gaming machine 1 is provided with: a cabinet 2 serving as a main body portion; a roulette unit 3 (a first gaming section for executing a first game; common station) provided at a substantial center of an upper face of the cabinet 2; and a plurality of player terminals 5 (10 player terminals in the present invention) installed around the roulette unit 3 so as to surround the roulette unit 3.

The player terminal 5 has: a gaming medium accepting device 6 for accepting entry of a gaming medium such as a bill or a medal to be used in a game; a controller 7 made up of a plurality of control buttons for the players to enter predetermined instructions; and an image display device 10 for displaying an image according to a game. This image display device 10 is constituted to enable BET operation for a first game that is executed by the roulette unit 3 and for a second game using rotational reels.

That is, the player can make BET operation for at least one of the first and second games by operating the controller 7 or the like while observing an image displayed on the image display device 10. In addition, payout openings 9 for paying out a gaming value are provided, respectively, at the side faces of the cabinets 2 at which player terminals 5 were installed, and a speaker 12 for supplying music and effect sound or the like is provided at the upper right of the image display device 10 of each player terminal 5.

The gaming medium acceptance device 6 is constituted as a device for accepting a medal having a gaming value, so that payout of a medal acquired by a game is executed from the payout opening 9. A medal sensor (not shown) is provided inside the gaming medium acceptance device 6. This medal sensor identifies a medal entered through an entry opening and counts the entered medals. In addition, a hopper (not shown) is provided inside the payout opening 9, and pays out a predetermined number of medals from the payout opening 9.

The roulette unit 3, as is generally known, is provided with a roulette board 13 having a rolling area in which a ball 11 rolls in a game. This roulette board 13 is basically made up of: a frame body 14 fixed to a support (not shown); and a rotation disk 15 accommodated and supported rotatably inside the frame body 14. On the rotation disk 15, a number of concave ball accommodation grooves 15a (38 grooves in the present embodiment) are formed in a circumferential direction.

This ball accommodation groove 15a is an accommodation portion for accommodating a rolling ball 11, and is numerically partitioned by a partition wall. Further, on the top face of the rolling disk 15 in the outer direction of each ball accommodation groove 15a, a number display plate 17 on which numbers "0", "00", and "1" to "36" are displayed as graphic characters is provided so as to correspond to each ball accommodation groove 15a.

In the roulette unit 3 mentioned above, a method of rolling the ball 11, a mechanism of driving the roulette board 13, and a method of recognizing a ball that dropped in the concave ball accommodation groove 15a formed on the rotation disk 15 (specifying the number of the groove in which a ball for specifying a game result dropped) are not primary features of the present invention. Therefore, a description of a detailed structure or operation is omitted. The driving or the like of a driving unit for driving these roulette units 3 is controlled at a main controller of the gaming machine 1 described later.

When the roulette unit 3 constituted as set forth above is installed at the cabinet 2 of the gaming machine 1, the upward entirety of the roulette board 13 is covered with a glass cover member 18. In this manner, the ball 11 rolling on the roulette board 13 at the time of gaming is retained so as not to fly out from the roulette board 3, and a foreign matter or the like is prevented from entering the inside of the roulette board 13 so that no illegal action or the like is taken.

The controller 7 to be installed at each player terminal 5 mentioned above is provided at the side part of the image display device 10, and buttons operated by a player are disposed. Specifically, a BET determination button 20, a CASH-OUT button 21, and a HELP button 22 are provided in sequential order from the left side.

The BET determination button 20 is a button to be depressed when BET is determined after BET operation has been made by the image display device 10 described later. That is, in a case where BET is determined, and then, BET is performed for a number described in the number display plate 17 corresponding to the ball accommodation groove 15a in which the ball 11 was accommodated in the roulette unit 3, it is determined to be winning. In the case of winning, a credit responsive to the number of betted chips is added to a credit currently owned by the player. In addition, this BET determination button 20 is also depressed when BET operation is made for a video game (a second game) executed in the image display device 10. These BET operations will be described later in detail.

The CASHOUT button 21 is, in general, a button to be depressed at the end of a game. When the CASHOUT button is depressed, the medals acquired by a game or the like so far (credited medals) are paid out from a payout opening 8.

The HELP button 21 is a button to be depressed in a case where a method of operating a game or the like is unidentified. When the HELP button 21 is depressed, a HELP screen indicating various items of operational information is displayed on the image display device 10 immediately after the button is depressed.

On the other hand, the image display device 10 is a so called touch panel type liquid crystal display on which a touch panel is mounted on a front face. A selection is enabled by depressing an icon displayed on the liquid crystal screen with fingers or the like.

Hereinafter, an exemplary display screen to be displayed on the image display device 10 in gaming will be described with referring to FIGS. 2 and 3.

Figure 2:
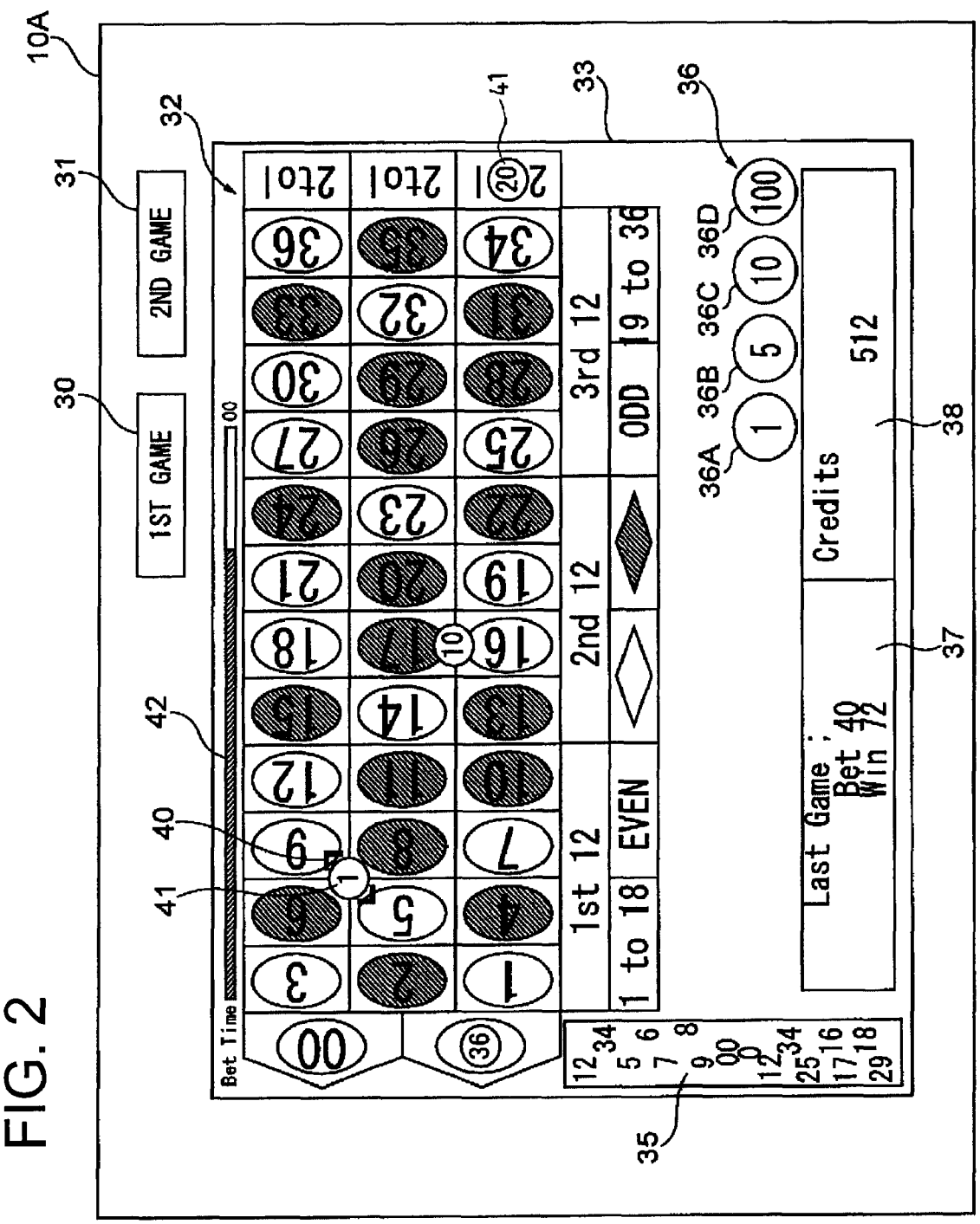
FIG. 2 is a view showing an example of a BET operation screen relative to a first game.

As shown in FIG. 2, at a touch panel 10A constituting the image display device 10, by depressing a game selection button (a first game selection button 30 or a second game selection button 31), an image corresponding thereto is displayed. For example, in a case where a player attempts to execute a game by the roulette game device 3, a BET screen 33 having a table type betting board 32 for betting chips while predicting a winning number is displayed by depressing the first game selection button 30.

The player can bet chips by using the player's own credit while the BET screen is employed. Specifically, the table type betting board 32 to be displayed on the BET screen 33 is constituted so that numbers identical to "0", "00", and "1" to "36" displayed on the number display plate 17 are arranged and displayed in a matrix manner. In addition, a specific BET area for betting chips by specifying "odd numbers", "even numbers", "types of colors of the number display plate (red or black)", and "given numeric range (such as "1" to "12", for example)" are also arranged in a matrix shape, similarly.

Downwardly of the table type betting board 32, a result log display section 35, a unit BET button 36, a payout result display section 37, and a credit amount display section 38 are displayed sequentially from the left of the screen.

The result log display section 35 displays a list of results of winning numbers in the past games (here, one game denotes a series of operations in which the player makes BET operation in each player terminal 5, the ball 11 drops in the ball accommodation groove 15a, and payout of credits is performed based upon the winning numbers). At this time, when one game terminates, new winning numbers are additionally displayed over and over, making it possible to verify the log of the winning numbers of a maximum of 16 games.

The unit BET button 36 is a button for a player to bet a specified BET area (on numbered and marked matrix or on a line forming a matrix). The unit BET buttons are made up of four types of buttons, i.e., a 1BET button 36A, a 5BET button 36B, a 10BET button 36C, and a 100BET button 36D.

The player first specifies a BET area, with the use of a cursor 40 shown in the figure, by directly depressing a BET area to be betted on a screen with fingers or the like. If the 1BET button 36A is depressed in this state, the player can bet chips on a one-by-one basis (BET numbers are increased in sequential order of "1"->"2", ->"3" every time the 1BET button 36A is depressed with fingers or the like). Operations of the 5BET button 36B and the 100BET button 36D are also performed similarly. Therefore, these operations are simplified at the time of betting a large amount of chips. The number betted by the player is displayed at a corresponding portion as a chip mark 41, as shown in FIG. 2.

The payout result display section 37 displays the BET number of the player's chips in a previous game and a credit amount of cashout. Here, the number obtained by subtracting the BET number from the credit amount of cashout comes under the credit amount newly acquired by the player through the previous game.

Further, the credit amount display section 38 displays a credit amount owned by a current player. This credit amount decreases in response to the BET number (one credit for one chip) at the time of betting chips. Moreover, in a case where the betted number is won, and then, credit cashout is made, the credit amount for the number of cashouts increases. In a case where the credit amount owned by the player becomes 0, it is determined that the game is over.

A BET timer graph 42 is provided at the upper part of the table type betting board 32. The BET timer graph 42 is a graph, which displays a remaining time at which the player can bet, and a red graph gradually extends to the right side at and after starting a game. When the graph extends to the rightmost side, a time expires at which BET operation in a current game is possible. In a case where the player's BET period has expired at each player terminal 5, i.e., in a case where the BET timer graph 42 has reached the rightmost side, a rolling operation of the ball 11 accommodated in the ball accommodation groove 15a in the previous game is started.

Next, with referring to FIG. 3, a description will be given as to an image display example to be displayed when the second game selection button 31 is depressed in the touch panel 10A of the image display device 10 shown in FIG. 2. Operating sections having the same functions as the operations shown in FIG. 2 are designated by like reference numerals.

When the player depresses the second game selection button 31 in image display shown in FIG. 2, a second game is executed in parallel with a first game (roulette game) in the image display device 10. In the present embodiment, the second game is constituted as a game for displaying three rotational reels in the image display device 10.

Specifically, three window frame display sections 51L, 51C, and 51R for rotationally displaying three rotational reels 50L, 50C, and 50R are displayed in image display areas of the image display device 10. At these window frame display sections 51L, 51C, and 51R, there are provided: a winning line L1 horizontally extending at the center; winning lines L2 and L3 that horizontally extend at the upper and lower positions thereof; and two diagonally extending winning lines L4 and L5. These winning lines L1 to L5 are activated by depressing payline display sections 53A to 53D, respectively.

As to the rotational reels 50L, 50C, and 50R, in order to provide a link with the first game, numbers "0", "00", and "1" to "36" are assigned, as symbols, to the respective rotational reels, and then, an image is controlled so that such rotational reels rotate. In this case, two of the three rotational reels are controlled to be stopped while their stopped symbols are determined by lottery processing. However, the remaining rotational reel is controlled to be stopped so that the result becomes identical to that finally determined by the roulette unit 3 that executes the first game.

Figure 3:
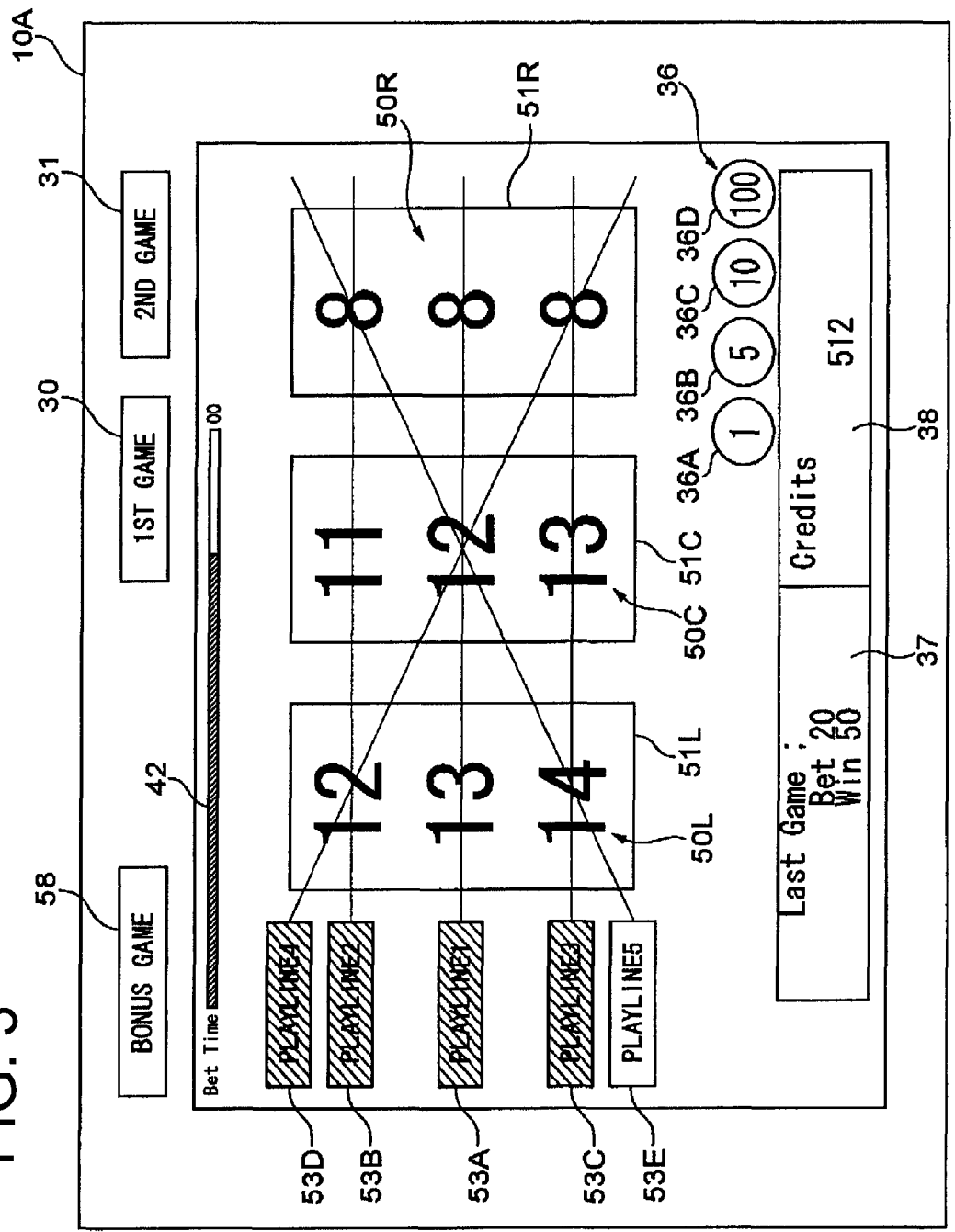
FIG. 3 is a view showing an example of a BET operation screen relative to a second game and the contents of the second game.

Specifically, as shown in FIG. 3, for example, the left and center rotational reels 50L and 50C are controlled to enter a stopped display mode of the result indicative of the lottery processing. In addition, the remaining right rotational reel 50R is controlled so that the result becomes identical to that finally determined by the roulette unit 3 that executes the first game. (The example shown in the figure indicates that a ball has dropped in the ball accommodation groove 15a of winning number "8" in the roulette unit 3).

In this way, one of the numbers arranged in winning lines L1 to L5 is determined by the roulette unit that executes the first game.

The second game mentioned above is executed at each player terminal 5 in parallel with the first game. The player can execute either or both of the first game (a roulette game) and the second game (a slot machine type game) in the image display device 10 installed at the player terminal 5.

Hereinafter, an example of procedures for executing the second game will be specifically described.

When the player depresses the second game selection button 31 mentioned above in the image display state shown in FIG. 2, the image shown in FIG. 3 is displayed. The player depresses payline display sections 53A to 53E, thereby activating a predetermined payline, and then, depresses a unit BET button (a 1BET button 36A, a 5BET button 36B, a 10BET button 36C, and a 100BET button 36D), thereby determining the BET amount.

The display example shown in FIG. 3 indicates a state in which the player has activated four paylines of the payline display sections 53A to 53D, has depressed the 5BET button 36B in that state, and has betted five chips on a line-by-line basis (the player has betted a total of 20 chips). The betted number is displayed at the payout result display section 37. Such BET operation can be performed until the BET timer graph 42 extends to the rightmost side as in the first game mentioned above.

Then, three rotational reels 50L, 50C, and 50R start rotation at the same time when the roulette unit for executing the first game mentioned above starts operation (when the ball 11 rolls), and rotation of the two rotational reels is controlled to be stopped until the result of the first game is determined. After that, an image is controlled to be displayed so that the result finally determined by the roulette unit 3 for executing the first game enters a stopped mode of the remaining rotational reel as it is.

Payment of the second game is preset according to a combination of numbers arranged in a payline. This payment rate and combination is not limitative in particular, making it possible to appropriately set: ×2 for a payout determined when specific numbers are displayed at the left side of the payline; ×10 for a payout determined when the same numbers are displayed on the two rotational reels; and ×100 for a payout determined when the same numbers are displayed on the three rotational reels. In the figure, it is shown that the same two numbers "12" are arranged in payline L4, and then, 50 pieces that are a payout amount of ×10 have been paid out relative to BET number 5.

The credit amount display section 38 displays a credit amount owned by a current player, as is the case with the display in the first game mentioned above. This credit amount decreases in response to the BET number when chips are betted (one credit for one chip). In a case where a betted payline is won, and then, cashout of credits is made, a credit amount equivalent to the number of cashouts increases.

In the second game executed as set forth above, when predetermined specific numbers ("7", for example) are arranged on a payline specified by the player, a special prize may be awarded to that player. This prize can be defined as a right to execute a game (a bonus game; a third game) in which the player can acquire a relatively large amount of gaming mediums. While such bonus game is executed, the player of the player terminal 5 can acquire a large amount of gaming mediums.

In such bonus game, for example, it is thought that the player rotates the rotational reels 50L, 50C, and 50R in a state in which all of the paylines are activated without using credited medals, so that a payment is awarded according to a combination of the stopped display modes. In addition, the display symbols of the rotational reels 50L, 50C, and 50R determined when a current game moves to a bonus game may be controlled so as to display special symbol arrangements. If the bonus game mentioned above is established, a bonus game display section 58 is lit, and then, the state is notified to the player.

The bonus games mentioned above may be executed at intervals between the games when the first games are executed, or alternatively, may be executed by only the player terminal solely, apart from execution of the first games.

Figure 4:
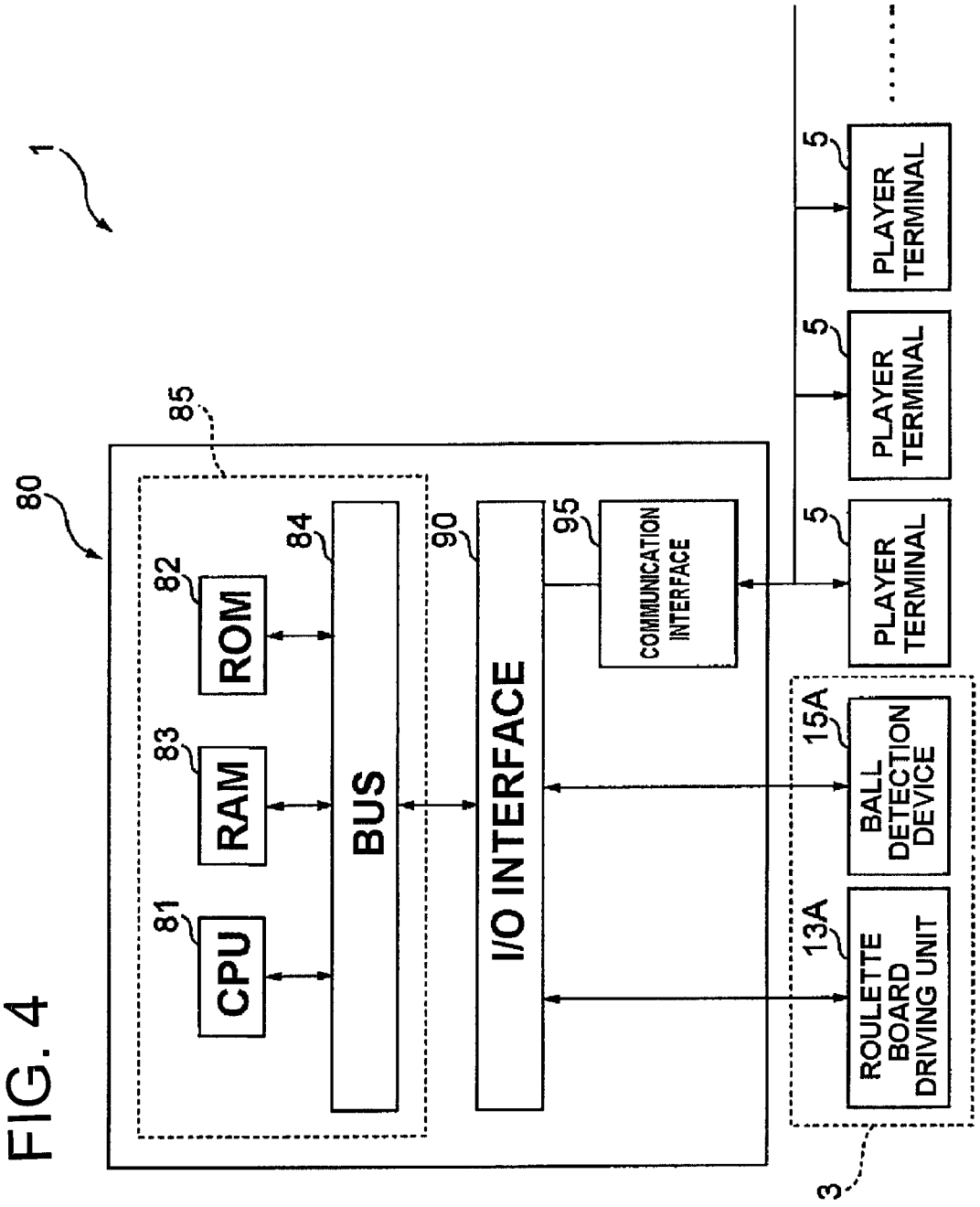
FIG. 4 is a block diagram showing a configuration of a control system of the gaming machine according to the present invention.

Next, a configuration pertinent to a control system of the gaming machine 1 mentioned above, will be described with referring to FIG. 4. FIG. 4 is a block diagram schematically depicting an entire control system of the gaming machine 1.

A main controller 80 of the gaming machine 1 has a microcomputer 85 constituted while a control CPU81, a ROM82, a RAM83, and a bus 84 for transferring data therebetween are employed as a base.

The CPU81 is connected via an I/O interface 90 to a variety of devices for driving the roulette unit 3, specifically, a roulette board driving unit 13A provided with a function of releasing the ball 11 onto the roulette board 13 and a ball detection device for specifying a position of the ball accommodation groove 15a in which the ball 11 finally stopped (dropped). A result signal from the ball detection device 15A denotes the end of the first game, and the number determined here is transmitted to each player terminal 5 via a communication interface 95 mentioned below.

The communication interface 95 is connected to the I/O interface 90. Via this communication interface 95, the main controller 80 transmits/receives, to/from each player terminal 5, a variety of data such as BET operation information, payment information, and result information and control information or the like, of the second game (a slot game) executed by each player terminal 5.

The ROM82 incorporated in the main controller 80 is made up of a semiconductor memory or the like, for example. This ROM stores programs for implementing basic functions of the gaming machine 1. Specifically, it stores programs for controlling a variety of composite units for driving the roulette unit 3 serving as a first gaming section; and programs or the like for primarily controlling each player terminal 5. In addition, the ROM82 stores a payment table or the like to be referenced at the time of executing a roulette game or a slot game.

The RAM83 is a memory for temporarily storing a variety of data computed by the CPU81. For example, this RAM temporarily stores: BET information of chips transmitted from each player terminal 5 (BET information relevant to a first game and BET information relative to a second game); result information transmitted from the ball detection device 15A; and data or the like pertinent to a result of processing executed by the CPU81. If the gaming machine is constituted to have a progressive function, BET accumulation information may be stored so as to accumulate the BET amount of chips transmitted from each player terminal 5 at a predetermined rate. As to the thus accumulated chips, payout processing is finally performed on condition that a special state is established at any of the player terminals 5 (on condition that a jackpot is established).

The CPU81 executes control processing of a series of game operations at the first gaming section. These game operations include: driving and controlling constituent elements of the roulette board driving unit 13A (such as a driving motor for rotationally driving a roulette board and a release mechanical for releasing a ball accommodated in any of the ball accommodation groove 15a, for example), based upon data or programs stored in the ROM82 and the RAM83 and detecting the number of the ball accommodation groove in which the ball is finally accommodated. Further, they include: executing winning determination processing pertinent to BET information of the first game transmitted from each player terminal 5; and transmitting data (credit data) concerning a payout amount relative to the player terminal 5 at which winning is established.

In addition to the above-mentioned control processing associated with the progress of a game, the CPU81 has a function of transmitting/receiving data to/from each player terminal 5, and then, primarily controlling each player terminal 5 to execute the second game (slot game). Specifically, this CPU accepts BET information transmitted from each player terminal 5 (BET information of the second game) and transmits, to each player terminal 5, game result information established by the roulette unit 3 that is a first gaming section (number information of a ball accommodation groove in which a ball stopped). The result of the second game executed by each player terminal 5 is established by transmission of the game result information from the main controller 80, and then, the result is displayed as an image. In addition, as to the result of the second game executed by the respective player terminal 5, winning determination processing is executed in the CPU81, and then, a payout amount is calculated with referring to a payment table. Then, data pertinent to the payout amount (credit data) is transmitted to the player terminal at which winning was established in the second game.

In this case, the stopped symbols of rotational reels in the second game (a slot game) executed at each player terminal 5 may be controlled by the CPU81, or alternatively, may be controlled at a controller of the player terminal 5 described later. As set forth above, among the three rotational reels in the second game, top symbols of two rotational reels are arbitrarily specified, and the stopped symbols of the remaining rotational reel are specified by the first game result. The stopped symbols of the two rotational reels can be specified by lottery processing. For example, while a random number generator and a sampling circuit or the like are connected to a terminal control CPU of a controller of each player terminal 5, it is possible to specify the symbols by extracting any random number or to specify them by sampling the random number on the CPU operating programs, without being limitative to a specific technique.

The CPU81 performs determination processing as to whether or not a bonus game is established at the time of performing the winning determination processing mentioned above. In a case where a bonus game is established at any player terminal 5, this CPU notifies the fact and receives the game result of the bonus game executed at the player terminal 5. Then, the CPU81 transmits data pertinent to a payout amount (credit data) to the player terminal 5.

Figure 5:
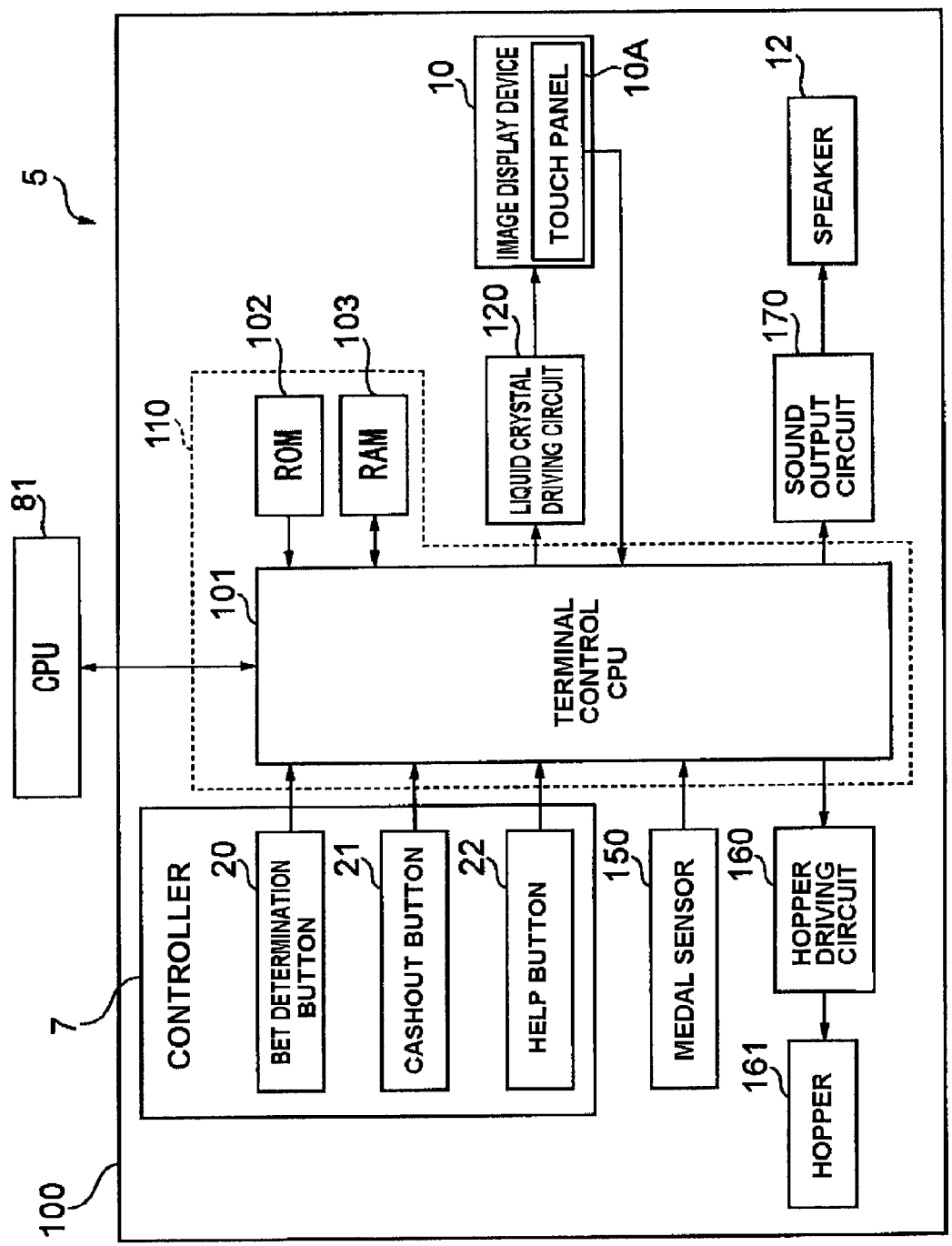
FIG. 5 is a block diagram depicting a configuration of a control system of a player terminal.

Next, a configuration according to a control system of the player terminal 5 connected to the CPU81 of the main controller 80 mentioned above, will be described. FIG. 5 is a block diagram schematically depicting a control system of the player terminal 5 according to the present embodiment.

A terminal controller 100 of the player terminal 5 has a microcomputer 100 constituted while a terminal control CPU101, a ROM102, and a RAM103 are employed as a base.

The ROM102 is constituted of a semiconductor memory or the like, for example. This ROM stores: programs for implementing basic functions of the player terminal 5; and various programs and a data table or the like, which are required for control of the player terminal 5.

The RAM103 is a memory for temporarily storing various data computed by the terminal control CPU 101, the credit number currently owned by the player, and a BET situation or the like of chips betted by the player.

A BET determination button 20 provided at the controller 7 (see FIG. 1), a CASHOUT button 21, and a HELP button 22, are connected to the terminal control CPU101, respectively. The terminal control CPU101 performs control in order to execute a variety of corresponding operations, based upon an operating signal outputted by depressing the buttons or the like. Specifically, this CPU executes a variety of processing operations, based upon the input signal supplied from the controller 7 upon the receipt of the fact that the player's operation has been inputted and based upon the data and programs stored in the ROM102 and the RAM103. Then, the CPU101 transmits the result of the execution to the CPU81 of the main controller 80 mentioned above.

An image display device 10 is connected via a liquid crystal driving circuit 120 to the terminal control CPU101. The liquid crystal driving circuit 120 is made up of a program ROM, an image ROM, an image control CPU, a work RAM, a VDP (Video Display Processor), and a video RAM or the like. The program ROM stores image control programs and various selection tables pertinent to display on the image display device 10. The image ROM stores dot data for forming images (BET table chart and rotational reel display image for executing a slot game). In this case, the image control CPU has a function of determining images for displaying the display results of rotational reels pertinent to a slot game serving as a second game set at the terminal control CPU101 (including a display result of two rotational reels determined based upon lottery processing and a display result specified by the first game) from among the dot data stored in advance in the image ROM in accordance with the image control programs stored in advance in the program ROM. In addition, the work RAM is constituted as temporary storing means when the image control CPU executes the image control programs. Further, the VDP forms an image responsive to the display contents determined by the image control CPU, and then, outputs the formed images to the image display device 10. The video RAM is constituted as temporary storage means when the VDP forms images.

A touch panel 10A is mounted on the front face of the image display device 10, as set forth above, and operational information of the touch panel 10A is transmitted to the terminal control CPU101. The touch panel 10A senses BET operation of the player's chips on the BET screens shown in FIGS. 2 and 3 mentioned above. The sensed information is transmitted to the terminal control CPU101. Then, based upon the transmitted information, the current player's BET information (the first game BET information and the second game BET information) is stored in the RAM103 whenever necessary. Further, the BET information is transmitted to the CPU81 of the main controller 80, and then, the transmitted information is stored in the BET information storage area of the RAM83.

Further, a medal sensor 150, a hopper driving circuit 160, and a sound output circuit 170 are connected to the terminal control CPU101. The medal sensor 150 senses a gaming medium such as a medal to be entered from a gaming medium accepting device 6, and then, transmits the sensed gaming medium as a credit signal to the terminal control CPU101. Upon the receipt of a new credit signal, the terminal control CPU101 increases a credit amount of the player stored in the RAM103. In addition, the hopper driving circuit 160 drives a hopper 161 by means of a command signal from the terminal control CPU101, and then, pays out a predetermined number of gaming mediums from a payout opening 9. Further, the sound output circuit 170 drives the speaker 12, and then, generates an effect sound at the time of performing various effects by means of a command signal from the terminal control CPU 101.

Next, a control operation of the gaming machine 1 constituted as mentioned above will be described based upon an operation to be made when a player enjoys a game at the player terminal 5.

Figure 6:
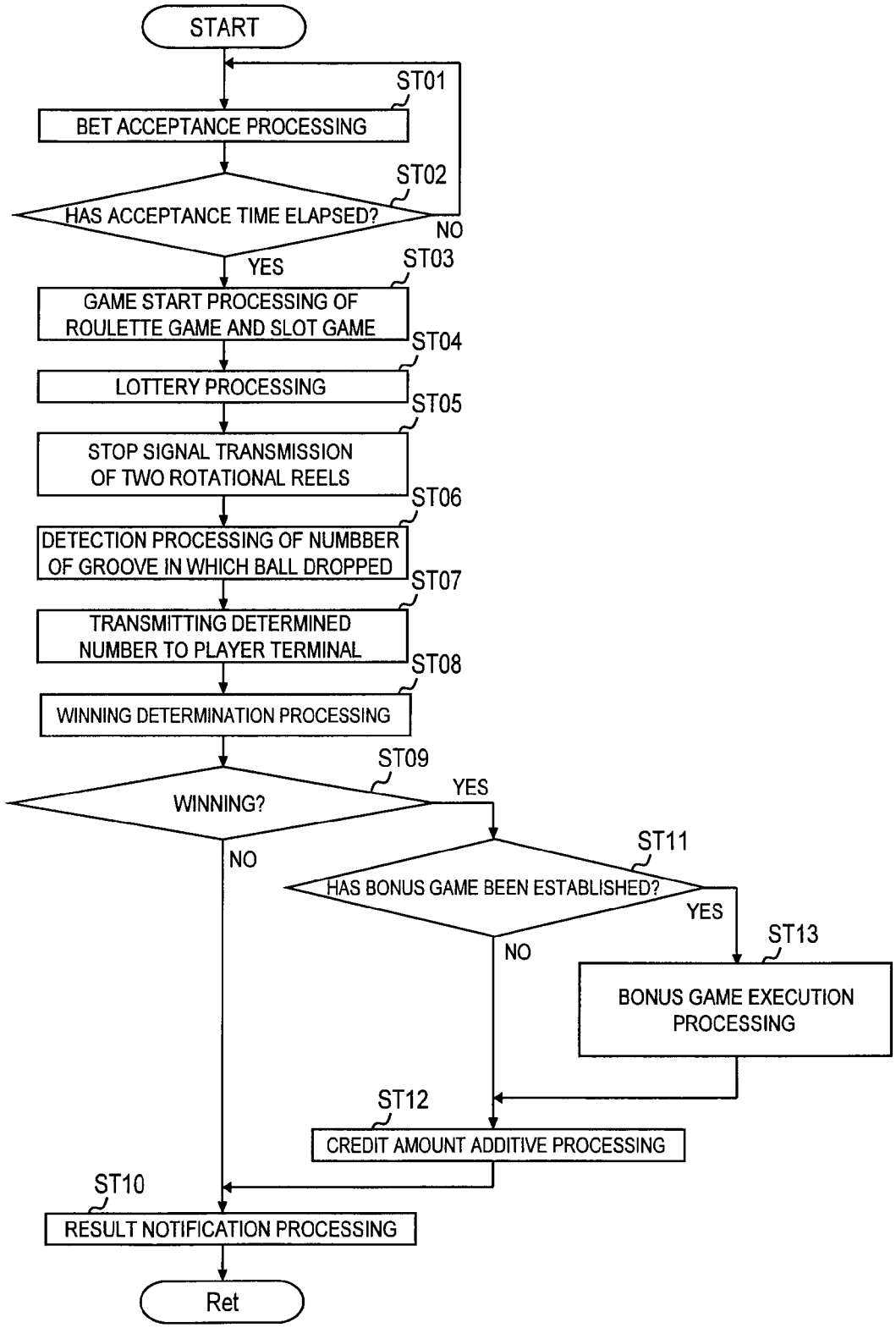
FIG. 6 is a flowchart showing exemplary procedures of the first and second games.

FIG. 6 is a flowchart showing a control operation of procedures for executing a first game (roulette game) and a second game (a slot game executed at the player terminal), which are executed between a main controller 80 and the player terminal 5 of the gaming machine 1.

First, the gaming machine 1 performs BET acceptance processing (step: ST01). During this BET acceptance processing, the player sitting at the player terminal 5 performs the BET operation mentioned above after entering a gaming medium such as a medal into the gaming medium acceptance device 6 or while observing the BET screen of the image display device 10. In this case, the player can make BET operation for both or either of the roulette game as the first game and the slot game as the second game by depressing a game selection button (a first game selection button 30 or a second game selection button 31) (See FIGS. 2 and 3).

During BET acceptance processing, a BET timer graph 42 is displayed on a BET screen at each player terminal 5, and then, the main controller 80 accepts BET operation within this period of time. The number that can be betted (the remaining chip amount) is displayed in a subtractive manner every BET operation at a credit amount display section 38 of the BET screen. The main controller 80 writes the BET contents into a predetermined storage area by player terminal 5 upon acceptance of the BET operation mentioned above from each player terminal 5.

The above-mentioned operation is executed until the BET acceptance time has elapsed (ST02). When the BET acceptance time has expired, the CPU81 of the main controller 80 transmits a drive signal to a roulette board driving unit 13A and transmits a drive signal for starting the second game to the terminal control CPU101 of the player terminal 5 at which BET operation was made for the second game, thereby executing game start processing at the image display device 10 of the roulette unit 3 and the player terminal 5 (ST03). At this time, at the roulette unit 3, the ball 11 rolls the periphery of the roulette board 13, and, at the image display device 10 of the player terminal 5, three rotational reels 50L, 50C, and 50R rotate. If the player does not sit at the terminal or does not make BET operation for the second game, although the slot game is not basically executed at the player terminal 5, the image display device 10 may display such image.

After a predetermined time has elapsed, lottery processing is executed on a player terminal basis (ST04), and then, based upon a result of the lottery processing, a signal for stopping two of the three rotational reels is transmitted to the player terminal 5 (ST05). Upon the receipt of this signal, the terminal control CPU101 of the player terminal performs stop control so that the stopped symbols of any two rotational reels are obtained as symbols that are based upon the lottery result.

In this state, although the ball is rolling the periphery of the roulette board 13, the ball then drops in any of 38 ball accommodation grooves 15*a*.

Continuously, a process of detecting the number of a groove of the ball that has dropped is performed (ST06), and then, the detected number is transmitted to the player terminal 5 (ST07). Upon the receipt of this signal, the terminal control CPU101 of the player terminal performs stop control so that the stopped symbol of the remaining rotational reel is obtained as the detected number.

Then, the CPU81 of the main controller 80 executes winning determination processing among the BET information by player terminal stored in the RAM83 (ST08). This winning determination processing includes both of BET on the roulette game as the first game and BET on the slot game as the second game.

At this time, if it is not determined to be winning (ST09, NO), it is judged to be the player's loss, and then, the result is transmitted to the player terminal (ST10). At each player terminal, result display processing such as displaying "LOSS" is performed at the payout result display section 37.

If it is determined to be winning in the winning determination processing mentioned above, it is continuously determined whether or not a bonus game is established (ST09, YES, ST11). A condition in which a bonus game is established is defined to be a state in which the predetermined specific numbers (for example, "7") are arranged on a payline specified by the player in the second game, for example, as set forth above.

If the player has not won a bonus game (ST11, NO), calculation of a payment amount (credit amount additive processing; ST12) is executed with referring to a predetermined payment table as it is. The result is stored in a predetermined work area of the RAM83, and then, the result information is transmitted to each player terminal 5. A liquid crystal driving circuit 120 is controlled to be driven, based upon the winning determination signal transmitted from the main controller 80. After that, update processing is performed at the payout result display section 37 and the credit amount display section 38 displayed on the BET screen. In addition, the terminal control CPU101 of each player terminal 5 drives a liquid crystal driving circuit 120 and a sound output circuit 170, and then, implements image effects or sound effects, whenever necessary.

On the other hand, if the player has won a bonus game (S11, YES) a process of executing a bonus game is performed as it is (ST13). This process of executing the bonus game is implemented while it is triggered by the fact that the CPU81 of the main controller 80 has notified the terminal control CPU101 that a bonus game has established. Upon the receipt of this signal, the terminal control CPU101 of the player terminal 5 controls a display image of rotational reels displayed on the image display device 10, enabling the player to execute a predetermined number of slot games without making BET operation in particular. Upon the receipt of an establishment signal, a special effect may be additionally implemented by the image display device 10 or the like.

When the bonus game mentioned above terminates, a credit amount additive processing (ST12) is executed; the calculation result is stored in a predetermined work area of the RAM83; and then, result notification processing is executed for the player terminal 5 (ST10). The player terminal performs update processing or the like of the payout result display section 37 and the credit amount display section 38 displayed on the BET screen in the same manner as that set forth above.

The gaming machine 1 set forth above executes a slot game (a second game) together with a roulette game (a first game), enabling the player to make BET operation for either or both of the first and second games according to the player's preference. Because the result of the second game is established by that of the first game, there is an interrelationship between the first and second games executed in parallel with each other, and the player is caused to have an interest in the results of both of the games. Thus, the sense of excitement that cannot be attained in a conventional single game can be attained, making it possible to accelerate an increase in game variations because the result of the second game is dependent upon that of the first game.

While the embodiments of the present invention were set forth insofar, the present invention can also be provided as set forth below, apart from the embodiments set forth above.

While, in the embodiments set forth above, a special prize to be awarded to a player was defined as a bonus game (a third game) to be given on condition that the player has participated in the second game, such specific prize may be awarded even if the player does not participate in the second game. For example, after the second game is always displayed as an image in parallel with the first game in the image display device 10, when the displayed image is established in a special state, a special prize (for example, a payment such as a jackpot) may be awarded to that player. In such configuration, a possibility arises where, even if the player does not make BET operation for both of the first and second games, a special state is established every time a game is started, thus making it possible for the player participating in a game of the game machine to always have an interest in the game.

While the gaming machine 1 set forth above was constituted so that the first game is a roulette game and the second game is a slot game using video reels, the types of games are not limitative in particular as long as the result of the first game is applicable to the second game, whereby the second game is established.

For example, it becomes possible to define a first game in which a plenty of players can particulate at the same time as a card game, a horserace game, or a dice game at a common station, and then, to implement a second game such that a result is established depending upon the result of the first game by player terminal, for example, as a slot game, a card game, or a bingo game, at the player terminal.

According to such aspect, at each player terminal 5, the player can enjoy either or both of the first game to be implemented at the common station and the second game to be implemented at the player terminal, according to the player's preference.

While, in the configuration set forth above, the main controller 80 controls a first game operation and a second game operation that is to be implemented at the player terminal 5, part of such control may be implemented at the player terminal 5. In addition, the payment at the BET section set forth above can be properly modified by area or regulation and the like. Further, a condition in which the bonus game set forth above is established (a condition in which a progressive bonus is established) and the game contents can also be implemented by various methods. For example, the bonus game can be implemented in various modes such as a card game, a roulette game, and a dice game other than the slot game set forth above.

What is claimed is:

1. A gaming machine, comprising:
a first gaming section for executing a first game;
a second gaming section for executing a second game in parallel with the first game;
an operating section, which is capable of making BET operation while predicting a result of a game to be executed at least at one of the first and second gaming sections; and
a controller,
the controller being configured to:
control gaming operations at the first and second gaming sections;
control payout processing of a gaming value corresponding to BET operation from the operating section and payment;
apply a result of the first game in the first gaming section to the second game to be executed in the second gaming section, and then, perform control so that the result of the second game executed in the second gaming section is established, wherein
the controller is configured to award a prize to a player on condition that the result of the second game is established in a predetermined special state when the result of the first game in the first gaming section is applied to the second game executed in the second gaming section;
a common station; and
a player terminal,
wherein the common station constitutes the first gaming section, in which the first game is executed, and the player terminal enables a plurality of players to execute a game and is provided with the operating section.

2. The gaming machine according to claim 1, wherein the player terminal has an image display section and the image display section displays the second game as an image and displays a BET table image for accepting the BET operation.

3. The gaming machine according to claim 2, wherein the prize to be awarded to the player is a bonus game to be executed at a player terminal at which the prize is to be awarded.

4. A gaming machine, comprising:
(a) a common station for executing a roulette game;
(b) a player terminal for executing a slot game of rotationally displaying a plurality of reels in parallel with the roulette game;
(c) an operating section, which is capable of making BET operation while predicting a result of a game to be executed at least at one of the common station and player terminal; and
(d) a controller,
the controller being configured to:
(i) control a gaming operation between the roulette game of the common station and a slot game of the player terminal;
(ii) control payout processing of a gaming value corresponding to BET operation from the operating section and payment;
(iii) stop and control rotation of at least one of a plurality of reels of the slot game, based upon random number generation; and
(iv) detect a result of a roulette game executed in the common station, and stop and control rotation of at least one of a plurality of reels of a slot game executed at the player terminal, based upon the detected result of the roulette game, wherein
the controller performs control so as to display rotation of at least one of a plurality of reels of the slot game in a stopped state, based upon the random number generation until a result of the roulette game is detected, and performs control so as to display, in a stopped state, rotation of a remaining reel that is displayed in a rotating state from among a plurality of reels of the slot game, based upon a result of the roulette game, when a result of the roulette game is detected.

5. A gaming machine, comprising:

(a) a common station for executing a roulette game;

(b) a player terminal for executing a slot game of rotationally displaying a plurality of reels in parallel with the roulette game;

(c) an operating section, which is capable of making BET operation while predicting a result of a game to be executed at least at one of the common station and player terminal; and (d) a controller, the controller being configured to:

(i) control a gaming operation between the roulette game of the common station and a slot game of the player terminal;

(ii) control payout processing of a gaming value corresponding to BET operation from the operating section and payment;

(iii) stop and control rotation of at least one of a plurality of reels of the slot game, based upon random number generation; and (iv) detect a result of a roulette game executed in the common station, and stop and control rotation of at least one of a plurality of reels of a slot game executed at the player terminal, based upon the detected result of the roulette game, wherein the roulette game has a plurality of winning values;

the plurality of reels has a plurality of symbols corresponding to the plurality of winning values of the roulette game; and the controller stops and controls rotation of the reel so that, when a result of the roulette game is detected, a symbol value corresponding to the winning value of the roulette game result is displayed.

* * * * *